US006971264B2

(12) United States Patent
Morimoto et al.

(10) Patent No.: US 6,971,264 B2
(45) Date of Patent: Dec. 6, 2005

(54) THROTTLE OPENING DEGREE DETECTING APPARATUS

(75) Inventors: Hajime Morimoto, Obu (JP); Kazumasa Nakashima, Obu (JP)

(73) Assignee: Aisan Kogyo Kabushiki Kaisha, Aichi (JP)

( * ) Notice: Subject to any disclaimer, the term of this patent is extended or adjusted under 35 U.S.C. 154(b) by 0 days.

(21) Appl. No.: 10/642,137

(22) Filed: Aug. 18, 2003

(65) Prior Publication Data

US 2004/0035193 A1 Feb. 26, 2004

(30) Foreign Application Priority Data

Aug. 23, 2002 (JP) .............................. 2002-244019

(51) Int. Cl.[7] .............................................. G01M 15/00
(52) U.S. Cl. ..................................................... 73/118.2
(58) Field of Search ................................ 73/116, 117.2, 73/117.3, 118.1, 118.2, 119 R

(56) References Cited

U.S. PATENT DOCUMENTS

| | | | | |
|---|---|---|---|---|
| 5,094,098 | A * | 3/1992 | Hori et al. | 74/7 E |
| 6,407,543 | B1 * | 6/2002 | Hagio et al. | 324/207.25 |
| 6,499,461 | B2 * | 12/2002 | Kubota et al. | 123/361 |
| 6,502,544 | B2 * | 1/2003 | Kubota et al. | 123/396 |
| 6,543,417 | B2 * | 4/2003 | Tanaka et al. | 123/399 |
| 2001/0003421 | A1 * | 6/2001 | Kubota et al. | 324/207.2 |
| 2001/0037794 | A1 * | 11/2001 | Wayama et al. | 123/399 |
| 2002/0130656 | A1 * | 9/2002 | Hagio et al. | 324/207.2 |
| 2002/0166362 | A1 * | 11/2002 | Kubota et al. | 73/1.75 |
| 2002/0189584 | A1 * | 12/2002 | Tanaka et al. | 123/399 |
| 2003/0135314 | A1 * | 7/2003 | Saito et al. | 701/51 |
| 2003/0221670 | A1 * | 12/2003 | Wayama | 123/399 |
| 2004/0135574 | A1 * | 7/2004 | Hagio et al. | 324/207.25 |
| 2004/0164729 | A1 * | 8/2004 | Ikeda et al. | 324/207.21 |

FOREIGN PATENT DOCUMENTS

| | | | |
|---|---|---|---|
| EP | 1 028 239 | A2 | 8/2000 |
| EP | 1 096 235 | A2 | 5/2001 |
| EP | 1 143 129 | A2 | 10/2001 |
| EP | 1 217 192 | A2 | 6/2002 |
| JP | 59-014930 | A1 | 1/1984 |
| JP | 2001-132494 | A1 | 5/2001 |

OTHER PUBLICATIONS

European Search Report; Application No.: 03018486.5-1263: dated Jun. 1, 2005.

* cited by examiner

*Primary Examiner*—Eric S. McCall
(74) *Attorney, Agent, or Firm*—Rader, Fishman & Grauer PLLC

(57) ABSTRACT

A throttle opening degree detecting apparatus includes a resin gear, a permanent magnet, a yoke and a magnetic sensor. The resin gear is connected to a throttle shaft of a throttle valve and provided with a depressed boss portion in an axial position. The permanent magnet is mounted and secured along an inner peripheral surface of the boss portion in the resin gear without an adhesive. The yoke is mounted and secured along the inner peripheral surface of the boss portion in the resin gear without an adhesive. The magnetic sensor is arranged in a fixed side so as to oppose to the permanent magnet in a non-contact manner and outputs a signal indicating a rotation angle of the resin gear as an opening degree of the throttle valve. The resin gear is insert-molded with the yoke and the permanent magnet.

5 Claims, 7 Drawing Sheets

THROTTLE OPENING DEGREE DETECTING APPARATUS

BACKGROUND OF THE INVENTION

1. Field of the Invention

The present invention relates to a throttle opening degree detecting apparatus used in a throttle control apparatus of an internal combustion engine, and more particularly to a throttle opening degree detecting apparatus having a structure which detects an opening degree of a throttle valve in a non-contact manner by using a permanent magnet, a yoke and a magnetic sensor.

2. Description of Related Art

As an apparatus for detecting a throttle opening degree of a throttle control apparatus in an internal combustion engine, there has been conventionally known a throttle opening degree sensor which detects a rotation angle of a throttle shaft in a throttle valve in a non-contact manner by using a permanent magnet and a magnetic sensor opposing to the permanent magnet, for example, in Japanese Unexamined Patent Publication No. 2001-132494.

The non-contact throttle opening degree sensor used in this kind of throttle control apparatus is structured such that a resin gear is fixed to an end portion of the throttle shaft, two divided circular ring-shaped permanent magnets are fixed to a boss portion of the resin gear, the magnetic sensor is arranged in a non-contact manner in an inner side of the circular ring-shaped permanent magnets so as to be mounted to a fixed side, and a rotation angle of the resin gear is detected as an opening degree of the throttle valve on the basis of an output signal output from the magnetic sensor.

However, in the this kind of conventional throttle opening degree sensor, since the circular ring-shaped permanent magnets are fixed within a recess portion of the boss portion in the resin gear fixed to a terminal end of the throttle shaft in accordance with a bonding by an adhesive agent, a number of man-hour for work is increased in accordance with the bonding, so that there is a problem that dispersion is generated in a fixing position of the permanent magnets in correspondence to the products.

In particular, since an outer peripheral portion of the circular ring-shaped permanent magnet has been conventionally bonded to the inner peripheral portion of the recess portion in the boss portion by the adhesive agent, a dimensional accuracy in the inner peripheral portion (a position opposing to the magnetic sensor) of the permanent magnet is deteriorated due to the dispersion in a film thickness of the adhesive agent. Accordingly, there has been a problem that dispersion is generated in an output level of the magnetic sensor, and a detecting accuracy of the throttle opening degree is adversely affected.

SUMMARY OF THE INVENTION

A throttle opening degree detecting apparatus in accordance with the present invention is structured such that a resin gear is connected to a throttle shaft of a throttle valve, a permanent magnet is mounted to a part of the resin gear, and an opening degree of the throttle valve is detected by detecting a rotation angle of the resin gear on the basis of an output signal from a magnetic sensor arranged in a fixed side so as to oppose to the permanent magnet in a non-contact manner, in which a depressed boss portion is formed in a position of an axis of the resin gear, a yoke and the permanent magnet is mounted along an inner peripheral surface of the boss portion, and the resin gear is insert molded by a synthetic resin by inserting the yoke and the permanent magnet.

An object of the present invention is to provide a throttle opening degree detecting apparatus which can accurately fix the permanent magnet within the resin gear by a less number of man-hour for work so as to accurately detect the throttle opening degree.

In this case, in the present throttle opening degree detecting apparatus, the structure may be made such that the yoke is formed in a circular ring shape by combining two divided semicircular arc portions, collar portions are formed in both ends, and a prismatic permanent magnet is arranged so as to be clamped by the collar portions in both side yokes. Further, the yoke and the permanent magnet arranged within the boss portion may be structured such that an outer peripheral surface except an inner peripheral surface thereof and a part of an upper end surface and a lower end surface are covered with a synthetic resin, by insert molding the resin gear.

Further, in the present throttle opening degree detecting apparatus, the structure may be made such that a groove reaching the outer peripheral surface of the yoke and the permanent magnet is formed in a peripheral portion of the boss portion in the resin gear. Further, the structure may be made such that a metal member for connecting the throttle axis is insert molded as an insert in the boss portion of the resin gear, and a part of the metal member is extended to the outer peripheral portion of the yoke and the permanent magnet, whereby a part of the metal member is brought into contact with the outer side surface of the yoke and the permanent magnet.

In accordance with the throttle opening degree detecting apparatus of the present invention, since the yoke and the permanent magnet are insert molded as the insert in the inner peripheral portion of the boss portion at a time of forming the resin gear, a number of man-hour for work can be widely reduced, and it is possible to accurately fix the permanent magnet and the yoke to a predetermined position, in comparison with the conventional case that the permanent magnet is bonded to the resin gear by using the adhesive agent. Accordingly, it is possible to accurately detect the throttle opening degree.

In particular, when insert molding the resin gear, for example, a part of the inner peripheral portion and the upper surface in the upper surface of the permanent magnet and the yoke are brought into contact with the metal mold so as to be pressed, and the lower surface of the permanent magnet and the yoke is pressed by a metal mold pin, by matching the molds in a state in which the permanent magnet and the yoke are set within the metal mold. Under the state mentioned above, a material is injected into the metal mold and the molding is performed.

Accordingly, the yoke and the permanent magnet arranged within the boss portion are formed such that the outer peripheral surface except the inner peripheral surface thereof and a part of the upper end surface and the lower end surface are covered with the synthetic resin, and the groove reaching the outer peripheral surface of the yoke and the permanent magnet is formed as a trace of a pressing portion of the metal mold in the peripheral portion of the boss portion in the resin gear.

Therefore, since the resin gear is insert molded in a state in which the permanent magnet and the yoke are accurately pressed to a fixed position in place of the mold as mentioned above, it is possible to firmly fix the permanent magnet and the yoke into the boss portion of the resin gear precisely.

In the present throttle opening degree detecting apparatus, the resin gear is connected to the throttle axis of the throttle valve, and the magnetic sensor is arranged to the fixing side in a non-contact manner within the depressed boss portion of the resin gear. At a time of operation, the resin gear rotates in correspondence to the opening and closing motion of the throttle valve, the permanent magnet and the yoke within the resin gear rotates in the same manner, signal indicating a rotation angle, that is, an opening degree of the throttle valve is output from the magnetic sensor, and the throttle opening degree is detected.

DESCRIPTION OF THE PREFERRED EMBODIMENTS

A description will be given of the present invention on the basis of embodiments shown in the accompanying drawings. In this case, this invention is not limited to the embodiments. All the modifications within the contents of claims or equivalents to the contents are included in the range of claims.

Figure 1:
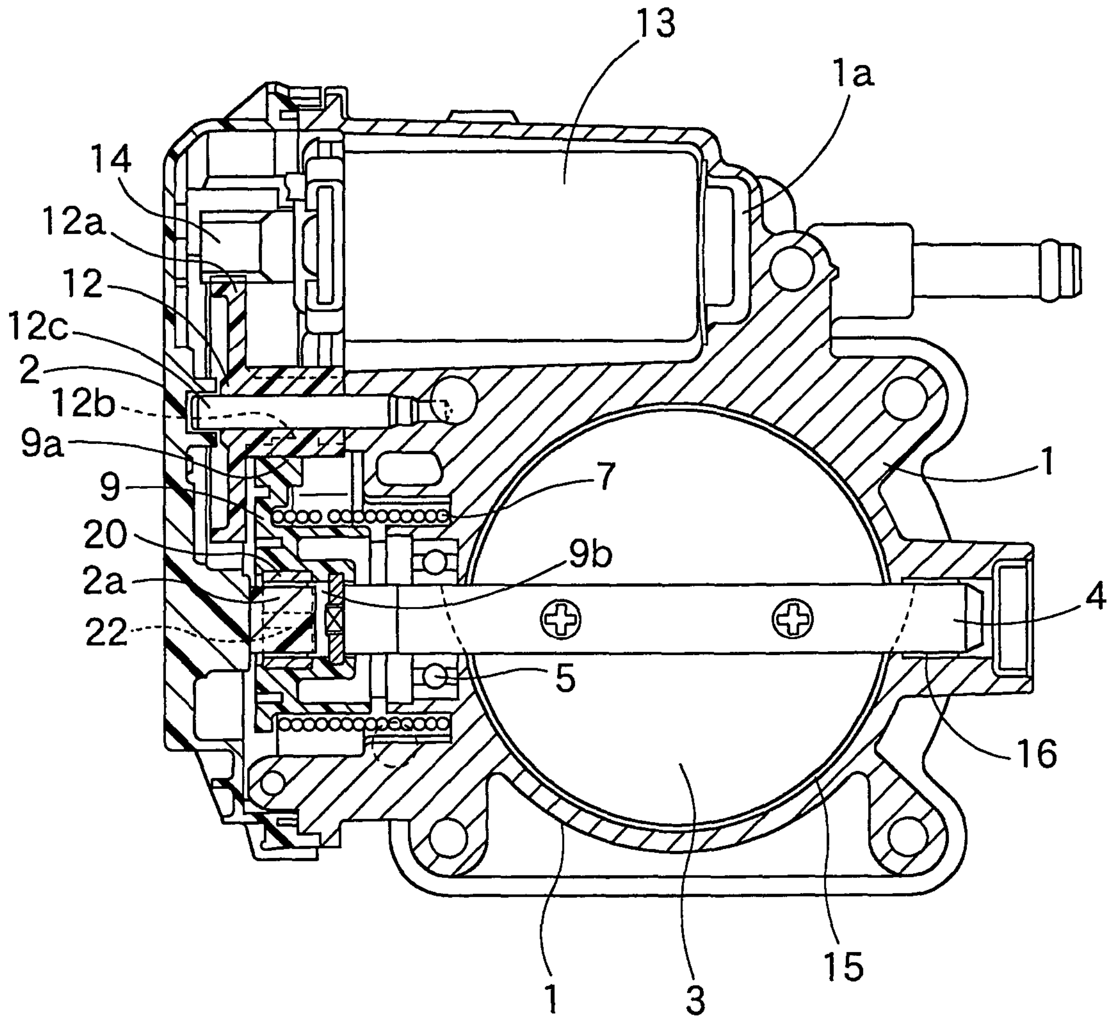
FIG. 1 is a cross sectional view of a throttle control apparatus showing one embodiment in accordance with the present invention.

FIG. 1 shows a cross sectional view of a throttle control apparatus for an internal combustion engine. The throttle control apparatus is structured such that a throttle axis 4 rotates via a gear mechanism in accordance with driving of a control motor 13, a throttle valve 3 on the axis is operated so as to open and close, and a throttle opening degree detecting apparatus detecting an opening degree of the throttle valve 3 is provided. Reference numeral 1 denotes a throttle main body. An intake passage 15 is formed in an inner portion of the throttle main body 1, and the throttle valve 3 of a butterfly type and a rotation type is arranged so as to open and close an inner side of the intake passage 15 via the throttle axis 4.

The throttle axis 4 is fixed to a center of the throttle valve 3, and both ends of the throttle axis 4 are rotatably supported by a ball and roller bearing 5 and a metal bearing 16. A torsion coil spring 7 is installed around the ball and roller bearing 5 and energizes the throttle valve 3 in a closing direction. The torsion coil spring 7 for returning is interposed between a resin gear 9 and the throttle main body 1.

Further, a resin gear 9 for rotation driving which rotates the throttle valve 3 is fitted and attached to the end portion of the throttle axis 4. A permanent magnet 21 constituting a part of a throttle opening degree detecting apparatus and a yoke 20 constituting a magnetic circuit are firmly fixed integrally to the resin gear 9 in accordance with an insert molding in the manner mentioned below.

Figure 2:
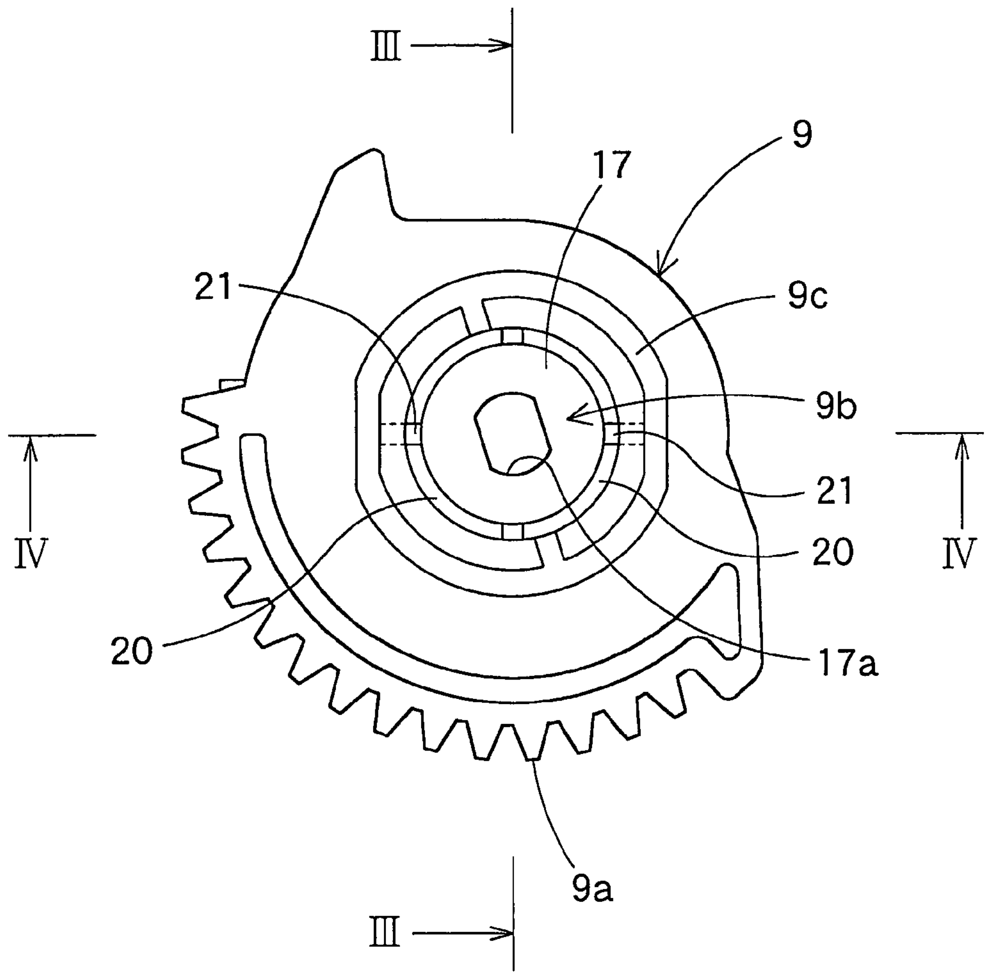
FIG. 2 is a plan view of a resin gear 9.

The resin gear 9 is structured, as shown in FIG. 2, such that a gear portion 9*a* is formed in a part of an outer peripheral portion, a depressed boss portion 9*b* is formed in a center portion to which the throttle axis 4 is fixed, and a metal plate 17 for connecting the throttle axis is arranged in a bottom portion of the boss portion 9*b*. A rectangular hole 17*a* is formed in a center of the metal plate 17 in such a manner that the end portion of the throttle axis 4 is fitted and attached to the metal plate 17 by a predetermined angle. The metal plate 17, the permanent magnet 21 and the yoke 20 are insert molded integrally at a time of molding the resin gear 9, and are fixed and arranged to predetermined positions with a high dimensional precision.

Figure 3:
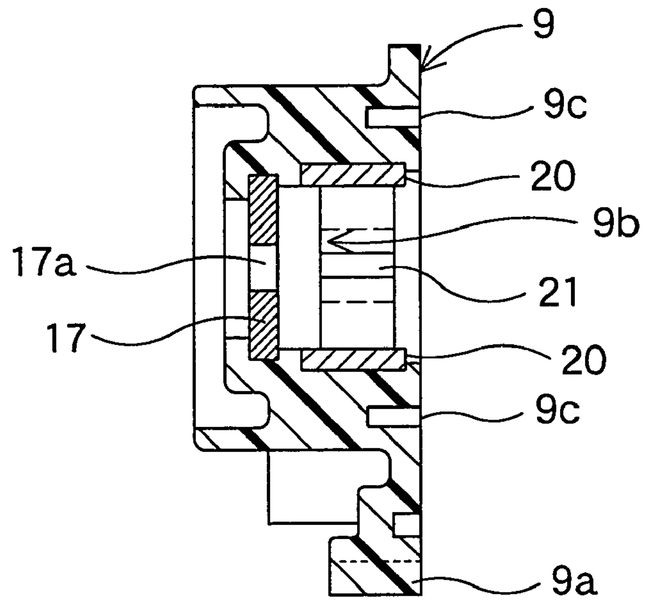
FIG. 3 is a cross sectional view along a line III—III in FIG. 2.
Figure 4:
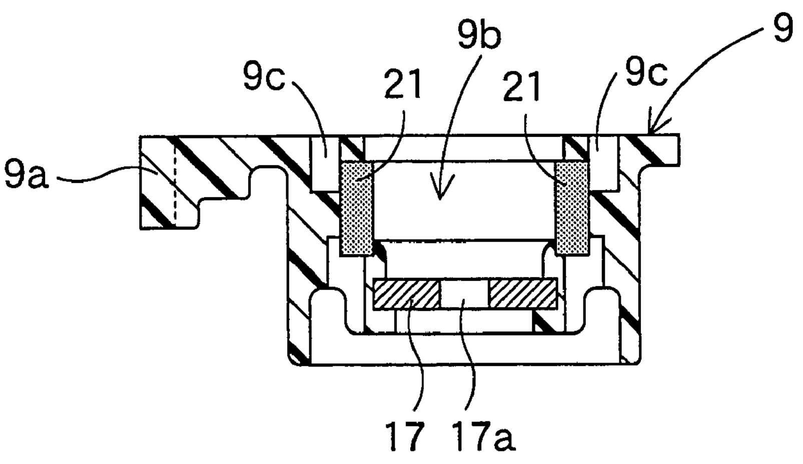
FIG. 4 is a cross sectional view along a line IV—IV in FIG. 2.
Figure 5:
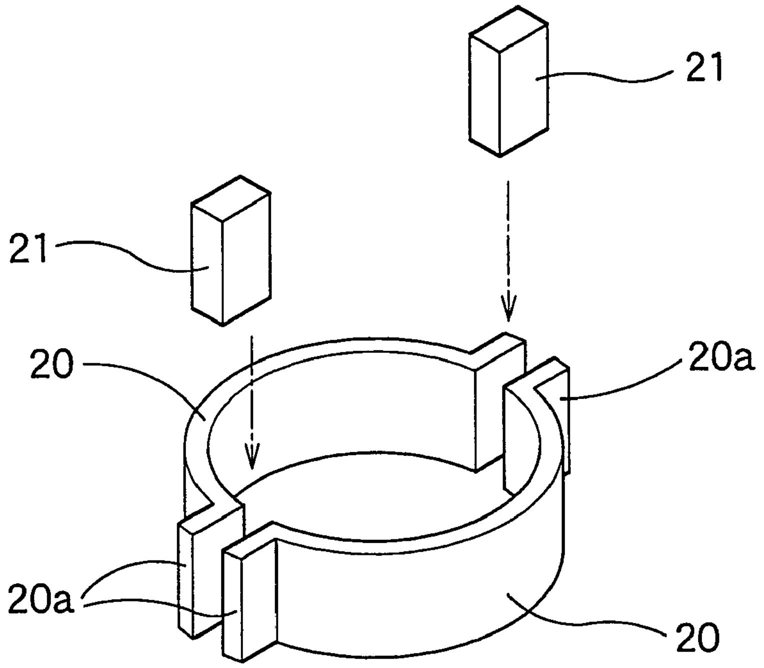
FIG. 5 is a perspective view of a permanent magnet 21 and a yoke 20.

As shown in cross sectional views in FIGS. 3 and 4, the depressed boss portion 9*b* is formed as a recess portion formed in a circular cup shape, and the permanent magnet 21 and the yoke 20 shown in FIG. 5 are firmly fixed to predetermined positions inside the depressed boss portion 9*b*. The yoke 20 is formed in a two-divided circular ring shape, and two semicircular arc yokes 20 are arranged so as to face to each other and form a circle. Further, a prismatic permanent magnet 21 is interposed in a wide portion in which both ends of both side yokes 20 are faced.

That is, as shown in FIG. 5, thick collar portions 20*a* are formed in both ends of two semicircular arc yokes 20, and two semicircular arc yokes 20 are arranged so as to clamp the prismatic permanent magnets 21 between the collar portions 20*a*. When molding the resin gear 9, two permanent magnets 21 and two yokes 20 are inserted to predetermined positions within the metal mold together with the metal plate 17 so as to be insert molded. The permanent magnet 21 and the yoke 20 are positioned within the boss portion 9*b* in accordance with the insert molding with a reduced number of man-hour and a high precision.

As is known from the plan view in FIG. 2 and the cross sectional view in FIGS. 3 and 4, an annular groove 9*c* is formed in a periphery of the depressed portion 9*b* of the resin gear 9, and the groove 9*c* reaches a part of the permanent magnet 21 and an outer peripheral portion of the yoke 20 which are buried into an inner peripheral portion of the boss portion 9*b* in the resin gear 9. Further, in the same manner, a hole portion is formed around the boss portion 9*b* in a back surface side (close to the metal plate) of the resin gear 9, and the hole portion reaches a part of an outer peripheral portion of the permanent magnet 21 and the yoke 20.

The resin gear 9 having the shape mentioned above is formed in accordance with an injection molding of a synthetic resin by using a predetermined metal mold. In this case, the permanent magnet 21 and the yoke 20 inserted as the insert into the metal mold at a time of molding, are pressed in the inner peripheral surface thereof by a part of the metal mold, and an outer peripheral portion including the collar portion 20*a* of the yoke 20 is pressed by a part of the metal mold so as to be molded. Further, at a time of molding, upper surfaces of the permanent magnet 21 and the yoke 20 are pressed by the metal mold, lower surfaces thereof are pressed by a metal mold pin energized by a spring, and are insert molded in this state. Further, as shown in FIGS. 2–4, the resin goes around the outer peripheral portions, the upper surfaces and the lower surfaces of the permanent magnet 21 and the yoke 20 with respect to the molded resin gear 9, and the permanent magnet 21 and the yoke 20 are firmly fixed to the fixed positions by the resin.

Accordingly, when injection molding the resin gear 9, the permanent magnet 21 and the yoke 20 are insert molded within the metal mold precisely in a state in which the permanent magnet 21 and the yoke 20 are held in the metal mold, and the permanent magnet 21 and the yoke 20 are positioned precisely so as to be firmly fixed and held within the boss portion 9*b* of the resin gear 9 corresponding to the insert molded product.

On the other hand, as shown in FIG. 1, a motor receiving portion 1 a is formed in an upper portion of the throttle main body 1, and a control motor 13 for driving so as to open and close the throttle valve 3 is received within the motor receiving portion 1*a*. A pinion gear 14 is fixed to a rotation axis of the control motor 13, and the pinion gear 14 is engaged with a large-diameter gear 12*a* of an intermediate gear 12 for speed reduction. The intermediate gear 12 is formed so as to have the large-diameter gear 12*a* and a small-diameter gear 12*b*, and is rotatably supported to a gear axis 12*c* which is pivoted to an inner side of the throttle main body 1. Further, the resin gear 9 is arranged so as to be engaged with the small-diameter gear 12*b* of the intermediate gear 12, the resin gear 9 is rotated via the intermediate gear 12 in accordance with the rotation driving of the control motor 13, and the throttle valve 3 coaxially arranged with the resin gear 9 is rotated so as to be controlled to be opened and closed.

Figure 6:
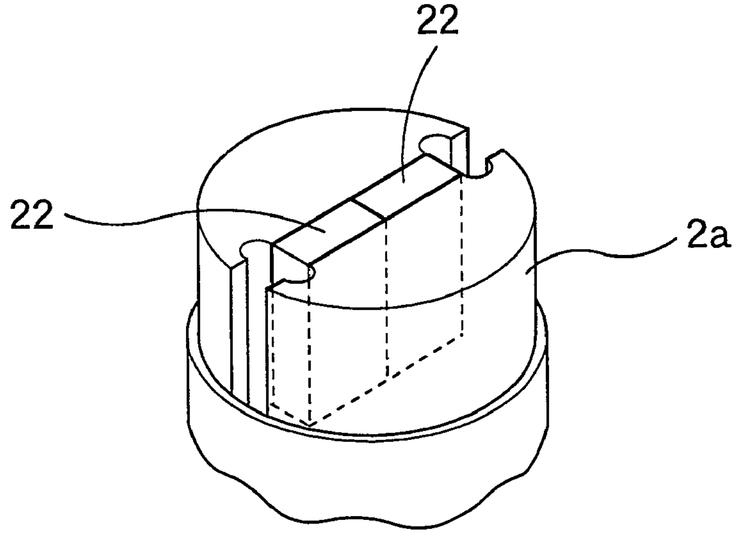
FIG. 6 is a perspective view of a magnetic sensor attached to a sensor attaching portion 2*a* in a side of a cover body.
Figure 7:
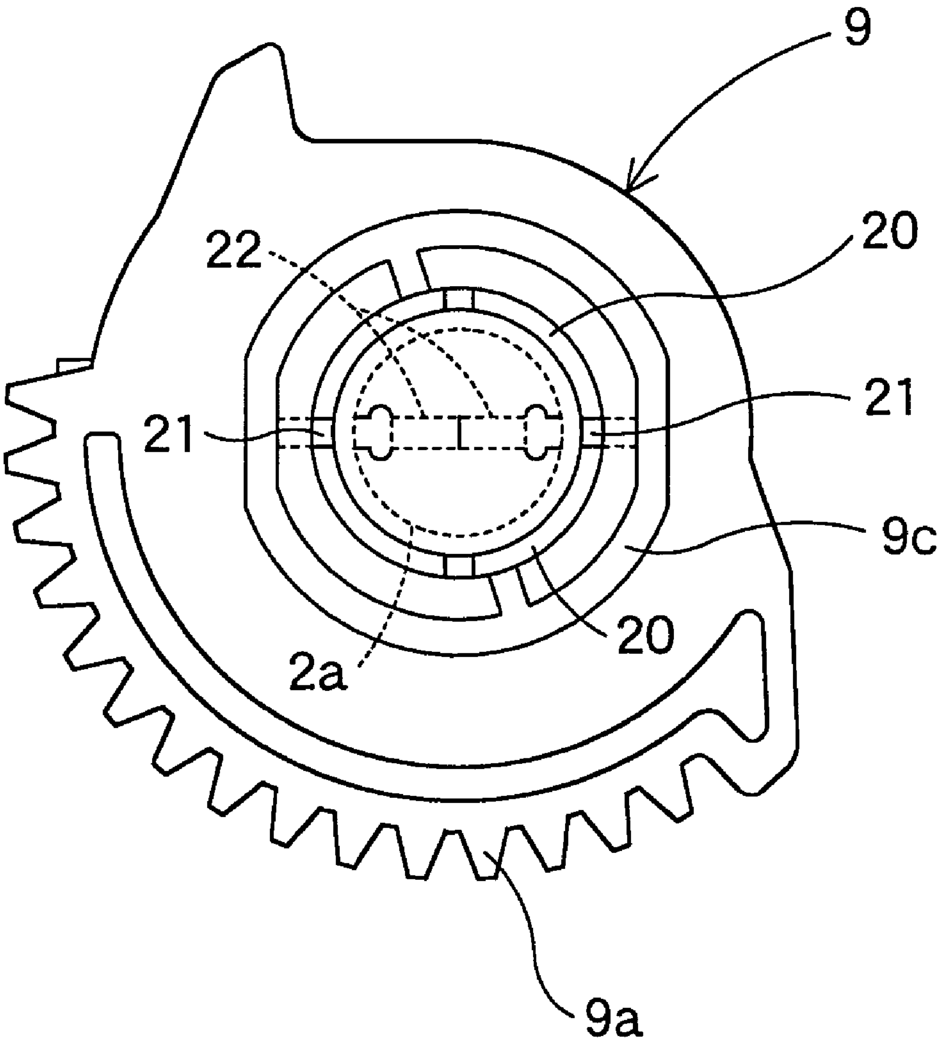
FIG. 7 is a plan view of the sensor attaching portion 2*a* and the resin gear 9.

Further, a cover body 2 is fitted and attached to the throttle main body 1 in a side in which the gear is arranged, in such a manner as to cover the portion. The cover body 2 is fitted and attached to an accurate position by fitting and inserting a fitting and inserting portion formed in correspondence to a fitting portion provided in a side of the throttle main body 1. A sensor attaching portion 2*a* is formed in a protruding manner in a position corresponding to the depressed boss portion 9*b* of the resin gear 9 in an inner side of the cover body 2, and a magnetic sensor 22 as shown in FIGS. 6 and 7 is mounted to the sensor attaching portion 2*a*.

The magnetic sensor 22 is structured by using a hole element, a hole IC, a magnetic resistance element and the like, is arranged in a position on a center axis provided in the sensor attaching portion 2*a* in such a manner as to be direct to an outer side on a magnetic detecting surface, and outputs a voltage signal or the like corresponding to an intensity of magnetic field. The cover body 2 is integrally formed by the synthetic resin together with the sensor attaching portion 2*a*. In this case, at this molding time, the magnetic sensor 22 can be insert molded as an insert at the predetermined position as mentioned above.

The sensor attaching portion 2*a* is inserted into the depressed boss portion 9*b* of the resin gear 9 in a state in which the sensor attaching portion 2*a* is accurately positioned in a non-contact state, by fitting and attaching the cover body 2 to the fixed position of the throttle main body 1. In this state, the magnetic detecting surface of the magnetic sensor 22 is arranged so as to oppose to the inner peripheral surfaces of the permanent magnet 21 and the yoke 20 positioned in the outer peripheral side of the magnetic sensor 22 in a non-contact manner, as shown in FIG. 7.

When a magnetic is applied by the permanent magnets 21 in both sides, for example, when an N pole is generated in the yoke 20 in the upper portion and an S pole is generated in the yoke 20 in the lower portion, a magnetic path flowing from the yoke to the yoke through the magnetic detecting surfaces in both sides of the magnetic sensor 22 is formed in the magnetic sensor 22 within the sensor attaching portion 2*a* arranged in a circular inner portion obtained by joining two semicircular arc yokes 20. The intensity of the magnetic field flowing through the magnetic path transversing between the yokes is changed on the basis of an angle of the magnetic sensor 22 with respect to the yoke 20 and the permanent magnet 21. An output voltage of the magnetic sensor 22 is changed in correspondence to the intensity of the detected magnetic field, and then a voltage signal indicating the rotation angle of the resin gear 9, that is, the throttle valve 3 is output.

The throttle opening degree detecting apparatus is provided with the permanent magnet 21, the yoke 20 and the magnetic sensor 22. In this structure, the magnetic sensor 22 is set to a fixed side, and an angle of the rotating resin gear 9, that is, an opening degree of the throttle valve 3 is detected on the basis of the output signal of the magnetic sensor 22. An output side of the magnetic sensor 22 is connected to a detection circuit and a controller for controlling an engine which are provided in an outer portion via a terminal portion (not shown) arranged in the cover portion 2.

This throttle control apparatus is mounted to an internal combustion engine of a motor vehicle. For example, when a driver works an accelerator pedal, the opening degree of the accelerator pedal is detected by an accelerator opening degree sensor, and a signal of the opening degree is transmitted to the controller for controlling the engine. The controller for controlling the engine outputs a driving signal corresponding to the accelerator opening degree signal to the control motor 13, that is, the driving signal is output to the control motor 13 so that the opening degree of the throttle valve 3 becomes an opening degree corresponding to the accelerator opening degree, whereby the control motor 13 is rotated.

The rotation of the control motor 13 is transmitted to the intermediate gear 12 via the pinion gear 14, and the resin gear 9 is rotated in accordance with the rotation of the intermediate gear 12 via the large-diameter gear 12*a* and the small-diameter gear 12*b*. Accordingly, the throttle axis and the throttle valve 3 are rotated only by a predetermined rotation angle against the energizing force of the torsion coil spring 7, and the throttle valve 3 is held at that angle within the intake passage 15.

At this time, the magnetic sensor 22 of the throttle opening degree detecting apparatus outputs a detection signal corresponding to the rotation angle of the resin gear 9, that is, the opening degree of the throttle valve 3, and the controller for controlling the engine inputs this signal as the throttle opening degree signal, whereby the signal is used for an arithmetical operation of a fuel injection amount of the engine or the like.

As mentioned above, since the permanent magnet 21 and the yoke 20 constituting the throttle opening degree detecting apparatus are arranged as the insert at the fixed positions within the metal mold, at a time of injection molding the resin gear 9, and are insert molded integrally, a number of man-hour for work is reduced in comparison with the conventional case that the permanent magnet 21 and the yoke 20 are bonded to the predetermined positions by using the adhesive agent. On the basis of the reduction of the number of man-hour, it is possible to improve a productivity and it is possible to reduce a manufacturing cost.

Further, since the permanent magnet 21 and the yoke 20 are molded by injecting the resin into the metal mold in a state in which the permanent magnet 21 and the yoke 20 are accurately positioned by a part of the metal mold or the metal mold pin from the side of the inner peripheral surface, a dispersion is reduced between the products in the precision of position of the permanent magnet 21 and the yoke 20 in the molded resin gear 9, in comparison with the conventional case that they are bonded by the adhesive agent, and a high precision is achieved. Therefore, it is possible to precisely detect the opening degree of the throttle valve.

FIGS. 8 to 12 show a resin gear 39 and the like in accordance with another embodiment. In place of the metal plate 17, a metal member 37 having an approximately cup shape is buried for connecting the throttle axis in the resin gear 39 of this embodiment. The same reference numerals are attached to the same elements as those in the embodiment mentioned above, and a description thereof will be omitted.

Figure 8:
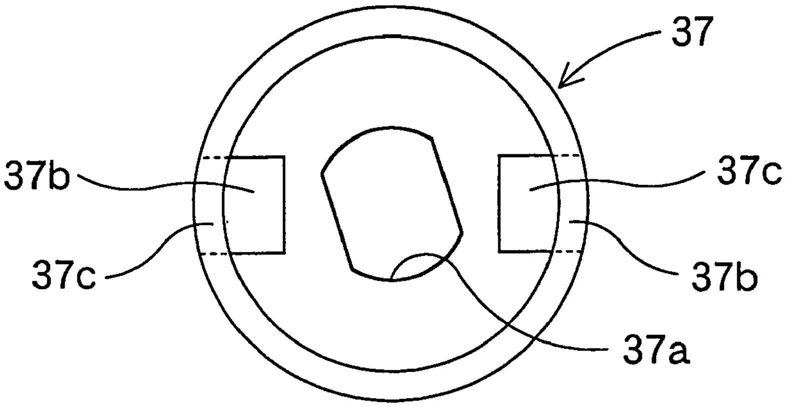
FIG. 8 is a plan view of a metal member 37 for connecting an axis in accordance with another embodiment.
Figure 9:
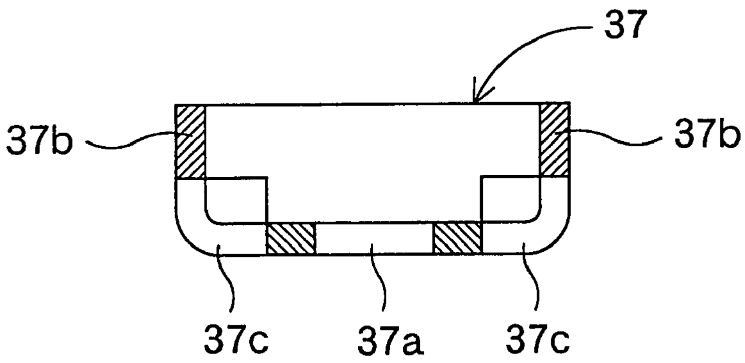
FIG. 9 is a cross sectional view of the metal member 37.
Figure 10:
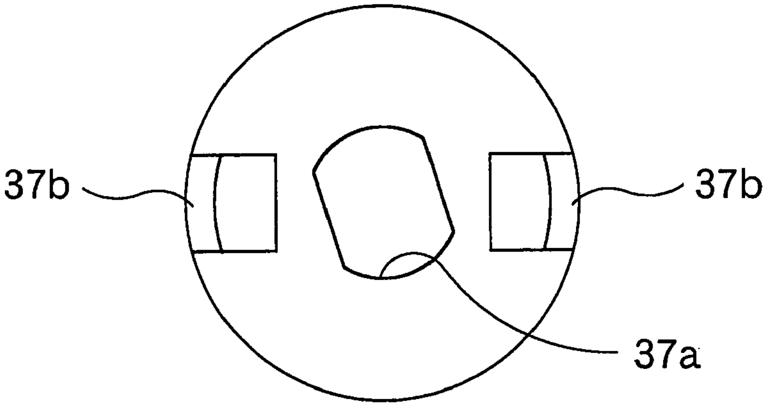
FIG. 10 is a bottom elevational view of the metal member 37.
Figure 11:
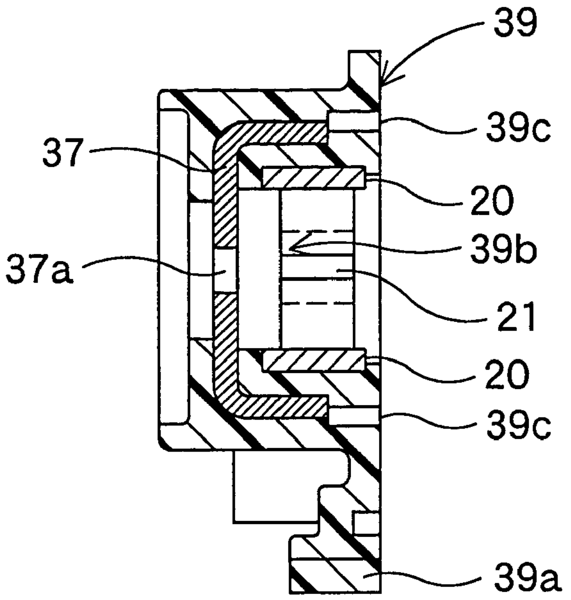
FIG. 11 is a cross sectional view of a resin gear 39 using the metal member.

The metal member 37 for connecting the throttle axis is insert molded in a boss portion 39*b* of the resin gear 39. The same gear portion 39*a* as mentioned above is formed in a part of the resin gear 39, and the yoke 20 and the permanent magnet 21 are annularly arranged and firmly fixed in an inner peripheral portion of the boss portion 39*b* formed in a circular recess shape in accordance with an insert molding. The metal member 37 is formed in an approximately cup shape as shown in FIGS. 8 to 10, a rectangular hole 37*a* for connecting the axis is formed in a bottom portion of the metal member 37, and opening portions 37*c* are formed in two portions in both sides of a bottom portion of the metal member 37. Further, a circular ring portion is formed in an upper portion of the opening portion 37*c*, and the circular ring portion is extended to an outer peripheral portion of the yoke 20 and the permanent magnet 21 which are firmly fixed to the inner peripheral portion of the boss portion 39*b*. The opening portion 37*c* corresponds to an opening for pressing and supporting the permanent magnet 21 by a metal mold pin or the like from a lower side, at a time of insert molding the resin gear 39 by setting the metal member 37 as an insert.

Figure 12:
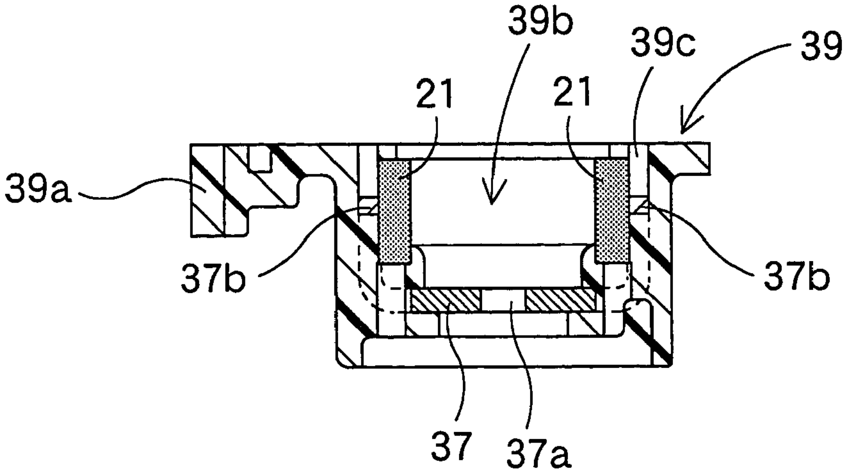
FIG. 12 is a cross sectional view of the resin gear 39 using the metal member.

Further, when insert molding, a part of the circular ring portion is brought into contact with the outer surface of the yoke 20 and the permanent magnet 21 as a pressing portion 37*b*, as shown in FIG. 12, and a displacement of the yoke 20 and the permanent magnet 21 is prevented at a time of insert molding by the pressing portion 37*b* of the metal member 37. In other words, the inserted yoke 20 and permanent magnet 21 tend to be displaced to an outer side at a time of injection molding the resin gear 39 on the basis of a linear expansion of the resin material, however, it is possible to prevent the yoke 20 and the permanent magnet 21 within the boss portion 39*b* from being displaced, by bringing the pressing portion 37*b* of the metal member 37 into contact with the outer peripheral portion of the yoke 20 and the permanent magnet 21 so as to clamp.

As described above, in accordance with the throttle opening degree detecting apparatus of the present invention, since the resin gear is insert molded such that the yoke and the permanent magnet are arranged as the insert in the inner peripheral portion of the boss portion at a time of forming the resin gear, a number of man-hour for work can be widely reduced, and it is possible to accurately fix the permanent magnet and the yoke to a predetermined position with no dispersion, in comparison with the conventional case that the permanent magnet is bonded to the resin gear by using the adhesive agent. Accordingly, it is possible to accurately detect the throttle opening degree.

Further, the outer peripheral surface except the inner peripheral surface in the yoke and the permanent magnet arranged within the boss portion and a part of the upper end surface and the lower end surface are covered with the synthetic resin, by insert molding the resin gear, as mentioned above. Further, an annular groove 39*c* reaching the outer peripheral surface of the yoke and the permanent magnet is formed in the peripheral portion of the boss portion in the resin gear. Accordingly, when matching the molds in a state in which the permanent magnet and the yoke are set within the metal mold, at a time of inserting molding the resin gear, for example, a part of the inner peripheral portion and the upper surface of the permanent magnet and the yoke are brought into contact with the metal mold so as to be pressed, and the lower surface of the permanent magnet and the yoke is pressed by a metal mold pin. Under the state mentioned above, a material is injected into the metal mold and the molding is performed. Therefore, the resin gear is insert molded in a state in which the permanent magnet and the yoke are accurately pressed to a fixed position, and it is possible to firmly fix the permanent magnet and the yoke into the boss portion of the resin gear precisely.

What is claimed is:

1. A throttle opening degree detecting apparatus comprising:

a resin gear connected to a throttle shaft of a throttle valve and provided with a depressed boss portion in an axial position;

a permanent magnet mounted along an inner peripheral surface of said boss portion in said resin gear and having a generally rectangularly-shaped cross-section defining a first surface facing inwardly relative to the inner peripheral surface of said boss portion and a second surface opposite the first surface facing outwardly toward the inner peripheral surface of said boss portion;

a yoke mounted along the inner peripheral surface of said boss portion in said resin gear; and a magnetic sensor arranged in a fixed side so as to oppose to said permanent magnet in a non-contact manner, and outputting a signal indicating a rotation angle of said resin gear as an opening degree of said throttle valve, wherein said resin gear is insert molded by inserting said yoke and said permanent magnet with the resin gear contacting at least a portion of both the first and second surfaces of the permanent magnet after being insert molded.

2. A throttle opening degree detecting apparatus as claimed in claim 1, wherein said yoke is formed in a circular ring shape by combining two divided semicircular arc portions, collar portions are formed in both ends, and a prismatic permanent magnet is arranged so as to be clamped by said collar portions in both side yokes.

3. A throttle opening degree detecting apparatus as claimed in claim 1, wherein the yoke and the permanent magnet arranged within the boss portion of said resin gear are covered with a synthetic resin in an outer peripheral surface except an inner peripheral surface thereof and a part of an upper end surface and a lower end surface.

4. A throttle opening degree detecting apparatus as claimed in claim 3, wherein a groove reaching the outer peripheral surface of said yoke and the second surface of the permanent magnet is formed in a peripheral portion of the boss portion in said resin gear.

5. A throttle opening degree detecting apparatus as claimed in claim 4, wherein a metal member for connecting the throttle axis is insert molded in the boss portion of said resin gear, and a part of said metal member is extended to the outer peripheral portion of said yoke and the second surface of the permanent magnet, whereby a part of said metal member is brought into contact with an outer side surface of said yoke and the permanent magnet.

* * * * *